(12) United States Patent
Vér

(10) Patent No.: US 12,466,483 B2
(45) Date of Patent: Nov. 11, 2025

(54) SENSOR ASSEMBLY

(71) Applicants: thyssenkrupp Presta AG, Eschen (LI); thyssenkrupp AG, Essen (DE)

(72) Inventor: Ábel Vér, Solymár (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 377 days.

(21) Appl. No.: 18/012,165

(22) PCT Filed: Jun. 21, 2021

(86) PCT No.: PCT/EP2021/066737
§ 371 (c)(1),
(2) Date: Dec. 21, 2022

(87) PCT Pub. No.: WO2021/259820
PCT Pub. Date: Dec. 30, 2021

(65) Prior Publication Data
US 2023/0257021 A1     Aug. 17, 2023

(30) Foreign Application Priority Data
Jun. 26, 2020   (DE) ..................... 10 2020 116 863.2

(51) Int. Cl.
*B62D 15/02*   (2006.01)
*G01L 5/22*   (2006.01)

(52) U.S. Cl.
CPC ............ *B62D 15/022* (2013.01); *G01L 5/221* (2013.01)

(58) Field of Classification Search
CPC ................ B60R 1/26; B60R 2300/207; B60R 2300/8066; B60T 7/42; B60T 2270/82; B60T 2220/04; H04B 3/54; H04B 2203/547; H04L 27/2601; G01D 15/00; G01D 1/00; G01L 3/104; G01L 5/221;
(Continued)

(56) References Cited

U.S. PATENT DOCUMENTS

| | | |
|---|---|---|
| 6,987,444 B2 | 1/2006 | Bub et al. |
| 7,668,636 B2 | 2/2010 | Hayashikawa et al. |

(Continued)

FOREIGN PATENT DOCUMENTS

| | | |
|---|---|---|
| CN | 101376375 A | 3/2009 |
| CN | 101734135 A | 6/2010 |

(Continued)

OTHER PUBLICATIONS

English Translation of International Search Report issued in PCT/EP2021/066737, dated Sep. 10, 2021.

*Primary Examiner* — Hai H Huynh
*Assistant Examiner* — Johnny H Hoang
(74) *Attorney, Agent, or Firm* — thyssenkrupp North America, LLC

(57) ABSTRACT

A sensor assembly for an electromechanical steering system of a motor vehicle may include a measuring device and a control device. The measuring device may include a torque sensor unit and an index sensor unit. The torque sensor unit may be connected to the control device by a power supply line to supply said unit with electrical energy. The sensor assembly is configured to transmit an index signal of the index sensor unit to the control device by modulating a signal that is transmittable via the power supply line.

13 Claims, 2 Drawing Sheets

(58) Field of Classification Search
CPC ... B62D 15/0215; B62D 15/0245; B62D 6/10
See application file for complete search history.

(56) References Cited

U.S. PATENT DOCUMENTS

| | | | |
|---|---|---|---|
| 9,035,484 | B2 | 5/2015 | Hurwitz et al. |
| 2002/0022912 | A1* | 2/2002 | Urabe ..................... B62D 6/10 |
| | | | 701/41 |
| 2009/0306844 | A1 | 12/2009 | Arita et al. |
| 2010/0242627 | A1* | 9/2010 | Okuyama .............. G01D 15/00 |
| | | | 73/862.335 |
| 2011/0167920 | A1 | 7/2011 | Rink et al. |
| 2013/0167660 | A1 | 7/2013 | Antoni et al. |
| 2015/0222398 | A1 | 8/2015 | Ott et al. |
| 2015/0226627 | A1* | 8/2015 | Kuwahara ............... G01L 3/105 |
| | | | 701/41 |
| 2016/0099821 | A1 | 4/2016 | Streit et al. |
| 2016/0323017 | A1 | 11/2016 | Stratford et al. |
| 2017/0104437 | A1* | 4/2017 | Suzuki ................ H02P 29/0241 |
| 2021/0086829 | A1* | 3/2021 | Knoll ....................... G01L 3/104 |
| 2022/0126910 | A1* | 4/2022 | Zhao ...................... B62D 5/046 |
| 2023/0065739 | A1* | 3/2023 | Husslein .............. B62D 5/0463 |
| 2023/0166788 | A1* | 6/2023 | Horvath ............... B62D 15/021 |
| | | | 701/41 |

FOREIGN PATENT DOCUMENTS

| | | |
|---|---|---|
| CN | 101868736 A | 10/2010 |
| CN | 108583768 A | 9/2018 |
| DE | 33 10 386 A1 | 10/1984 |
| DE | 10 2009 033 242 A1 | 1/2010 |
| DE | 10 2010 064 145 A1 | 2/2012 |
| DE | 10 2012 200 239 A1 | 7/2013 |
| JP | S6025328 A | 2/1985 |
| JP | 2010-280332 A | 12/2010 |

\* cited by examiner

SENSOR ASSEMBLY

CROSS REFERENCE TO RELATED APPLICATIONS

This application is a U.S. National Stage Entry of International Patent Application Serial Number PCT/EP2021/066737, filed Jun. 21, 2021, which claims priority to German Patent Application No. DE 10 2020 116 863.2, filed Jun. 26, 2020, the entire contents of which are incorporated herein by reference.

FIELD

The present disclosure generally relates to steering systems, including sensor assemblies for electromechanical steering systems of motor vehicles.

BACKGROUND

In electromechanical steering systems, in particular in steer-by-wire steering systems, for motor vehicles, sensor assemblies can be used that detect both a torque input into a steering spindle and a rotation angle of the steering spindle, wherein the steering spindle is fixedly connected to a manual steering control, e.g. a steering wheel. Index sensor units can also be used to detect a steering spindle rotation angle. Such a sensor assembly with an index sensor unit is also called a Torque and Index Sensor or TIS. The torque input into the steering spindle is also referred to as steering torque and the angle of rotation of a steering spindle is also known as steering rotation angle.

The detection of a motor vehicle driving straight ahead plays a key role in the status monitoring of motor vehicles. The status monitoring of motor vehicles in turn contributes to improving vehicle safety. In particular in conjunction with driver assistance systems, the recognition of straight-ahead driving is a safety-relevant function. This is because incorrect detection of straight-ahead driving could create dangerous situations for the driver and the occupants of the motor vehicle and for other road users. Ensuring reliable and fail-safe detection of straight-ahead driving, in particular in compliance with the Automotive Safety Integrity Level or ASIL, is therefore of great importance in the development of modern motor vehicles.

Document DE 10 2012 200 239 A1 discloses a redundantly designed sensor assembly. To improve operational safety, provision is made to increase the number of sensor units and connect them to the control device via a bus arrangement. However, this solution increases the implementation effort, in particular the cabling requirements.

Straight-ahead driving can be detected using signals from various sensor units, such as torque signals, vehicle speed signals, vehicle acceleration signals or time-based signals. Typically, the time intervals available for driver assistance systems to complete the upcoming tasks in their working and/or operating procedures are relatively short, for example in the millisecond or second range. For this reason, in order to ensure that a driver assistance system operates optimally, it is crucial that straight-ahead driving is not only detected as reliably as possible, but also detected as quickly as possible. Index sensor units can be used to improve the response speed in detecting straight-ahead driving.

However, the use of index sensors requires additional cabling effort. This is because the index sensor units must be electrically connected or wired to the control device within the sensor assembly. Due to higher material and assembly costs of sensor assemblies with index sensor units, this results in increased costs compared to sensor assemblies without index sensor units. In addition, the implementation of additional cables and/or electrical conductors can mean that the use of standardized interfaces that may have been used previously is no longer guaranteed.

To reduce cabling effort, it is known from documents U.S. Pat. Nos. 6,987,444 B2 and 9,035,484 B2 to use an already existing power lead between individual devices to enable data exchange or communication between these devices. This eliminates the need for separate communication cables between these devices.

Thus a need exists for a sensor assembly for the reliable and fast detection of straight-ahead driving with as little implementation effort as possible.

DETAILED DESCRIPTION

Figure 1:
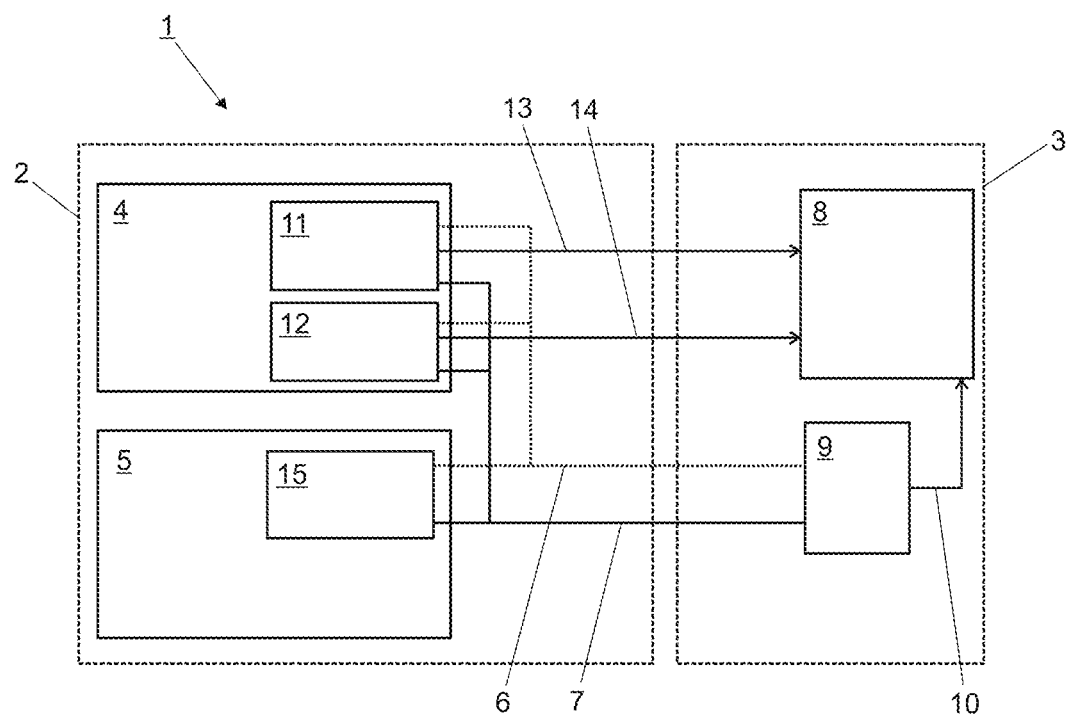
FIG. 1 is a block diagram of an example sensor assembly.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a sensor assembly for an electromechanical steering system of a motor vehicle. In some examples, such a sensor assembly may include a measuring device and a control device. The measuring device comprises a torque sensor unit and an index sensor unit, and the torque sensor unit is connected to the control device by means of a power supply line to supply said sensor unit with electrical energy. Furthermore, the present disclosure generally relates to a method for detecting straight-ahead driving of a motor vehicle comprising a steering spindle by way of the sensor assembly.

A sensor assembly for an electromechanical steering system of a motor vehicle is proposed, comprising a measuring device and a control device, the measuring device comprising a torque sensor unit and an index sensor unit and the torque sensor unit being connected to the control device by a power supply line in order to supply it with electrical energy, that is to supply the torque sensor unit with electrical energy, characterized in that the sensor assembly is designed to transmit an index signal of the index sensor unit to the control device by modulating a signal that can be transmitted via the power supply line.

The index sensor unit preferably provides an index pulse for detecting straight-ahead driving. The index pulse is not a complex data structure; in particular, it does not provide a cyclic redundancy check. Instead, the index pulse is preferably a simple, asynchronous analog pulse or shock that can be generated by hardware components. Dedicated software for signal generation or additional signal processing is not required. The index sensor unit allows the sensor assembly according to the invention to provide comparatively fast detection of straight-ahead driving. The straight-ahead driving detection can be an algorithm or software implemented on or in the control device.

The index sensor unit can be designed to increment an internal counter by one when a defined spatial condition between the index sensor unit and an object to be detected is met. The object to be detected can be a point, for example a metallic elevation, defined in the circumferential direction of a pivotably mounted steering spindle of the steering system. Preferably, the index sensor unit comprises a Hall-effect sensor.

The fact that the sensor assembly is designed to transmit an index signal of the index sensor unit to the control device by modulating a signal that can be transmitted via the power supply line makes it possible to transmit the index signal between the measuring device and the control device without the need for additional cabling. Thus, it is also possible to continue to use previously used, standardized interfaces although additional information is transmitted in the form of the index signal. This helps to reduce or avoid added costs.

Preferably, the torque sensor unit is designed to receive the index signal from the index sensor unit and modulate it onto the signal transmitted via the power supply line. The index sensor unit is also preferably designed to transmit the index signal to the torque sensor unit. This ensures that the index signal from the index sensor unit is transmitted to the control device via the torque sensor unit. The power supply line can be implemented in the form of an electrical power lead.

Advantageously, the signal that can be transmitted via the power supply line is a signal of an electrical voltage, that is, an electrical voltage signal. Alternatively, the signal that can be transmitted via the power supply line is advantageously a signal of an electrical current strength, i.e. an electrical current strength signal or an electrical current signal.

More advantageously, the torque sensor unit and/or the index sensor unit comprises or comprise a modulation unit. The modulation unit is used to modulate a useful signal or modulation signal to be transmitted onto a carrier signal, i.e. to modify it in a defined manner. In this case, the index signal corresponds to the useful signal and the electrical voltage or current signal corresponds to the carrier signal. The modulation unit is preferably an analog hardware component.

Even more advantageously, the control device is designed to demodulate the modulated index signal. In this way, the control device recreates the useful signal previously modulated onto the carrier signal and can then supply the useful signal to a further processing stage, in particular the straight-ahead driving detection.

Preferably, the control device comprises a demodulation unit. Alternatively, the control device can comprise a control unit, which is designed as a microprocessor, and a demodulation unit. The demodulation unit is used to restore the useful signal previously modulated onto the carrier signal for further processing of the useful signal. In this case, the index signal corresponds to the useful signal and the electrical voltage or current signal corresponds to the carrier signal. The demodulation unit is preferably an analog hardware component.

It is also preferable that the modulation is a modulation of the electrical voltage or the electrical current strength. The modulation of the electrical voltage modifies the voltage signal in a defined manner. The modulation of the electrical current strength modifies the current signal in a defined manner.

The modulation is preferably a frequency modulation or an amplitude modulation. This means that the parameters of frequency or amplitude describing the signal are modified in a defined way.

In a preferred embodiment, the torque sensor unit comprises at least two torque sensors, wherein the at least two torque sensors are connected to the control device via the power supply line in order to supply said sensors with electrical energy. This increases the level of redundancy and thus helps to ensure a reliable and fail-safe detection of straight-ahead driving.

The sensor assembly is advantageously designed to operate in direct current (DC). When the index sensor unit or the index sensor is activated, its DC current consumption changes. When the index sensor unit or the index sensor is deactivated again, the DC current consumption returns to its original value. It therefore acts as a DC power supply that can vary with certain dynamic properties. The advantage obtained is the smaller number of signal leads required. In other words: it is sufficient to use fewer signal cables. It is true that this poses a certain challenge from the point of view of signal evaluation. However, with suitable filtering it is possible to detect the time of activation and deactivation of the index sensor unit or the index sensor, i.e. the switching time. This can be implemented by RC filtering or software-based filtering.

Furthermore, a method is proposed for detecting straight-ahead driving of a motor vehicle comprising a steering spindle by means of the sensor assembly according to the invention, comprising the following steps: providing a torque signal by means of the torque sensor unit, in other words, determining the torque input into the steering spindle by means of the torque sensor unit; providing an index signal comprising at least one index pulse by means of the index sensor unit; transmitting the torque signal to the control device; transmitting the index signal via the power supply line to the control device by modulation; detecting straight-ahead driving based on the torque signal and the index signal.

Advantageously, the sensor assembly is designed to modulate the index signal onto the signal to be transmitted via the power supply line, in particular onto the electrical voltage signal or the electrical current signal; the control device is designed to demodulate the modulated index signal; and the transmission of the index signal comprises the following steps: modulating the index signal provided onto the signal that can be transmitted via the power supply line; transmitting the modulated signal, which can be transmitted via the power supply line, to the control device; demodulating the index signal, in other words, recreating the index signal from the modulated signal that can be transmitted via the power supply line.

FIG. 1 shows an embodiment of a sensor assembly 1 according to the invention in a block diagram.

The sensor assembly 1 is suitable for an electromechanical steering system of a motor vehicle. The sensor assembly 1 comprises a measuring device 2 and a control device 3, with the measuring device 2 comprising a torque sensor unit 4 and an index sensor unit 5. The torque sensor unit 4 is connected to the control device 3 via a power supply line 6 to supply electrical energy to the sensor unit. The power supply line 6 is designed as an electrical power lead. The sensor assembly 1 is designed to transmit an index signal of the index sensor unit 5, i.e. a signal generated by the index sensor unit 5, to the control device 3 by modulating a signal that can be transmitted via the power supply line 6. Since the power supply line 6 in this case is an electrical power lead, the signal to be transmitted via the power supply line 6 is an electrical current signal. The modulation is a modulation of the electrical current strength. The torque sensor unit 4 and the index sensor unit 5 are each connected to the control device 3 via a ground lead 7.

The control device 3 comprises a control unit 8 designed as a microprocessor, and a demodulation unit 9. The demodulation unit 9 is connected via the power supply line 6 and via the ground lead 7 to the measuring device 2, more precisely to the torque sensor unit 4 and the index sensor unit 5. In addition, the demodulation unit 9 is connected to the control unit 8 via a lead 10 designed as a cable or conductor track. The demodulation unit 9 is designed to receive and demodulate the signal that can be transmitted via the power supply line 6, i.e. to recreate the index signal previously modulated onto the electrical current signal for further processing.

The torque sensor unit 4 comprises two torque sensors 11, 12, namely a first torque sensor 11 and a second torque sensor 12. The first torque sensor 11 and the second torque sensor 12 are connected to the control device 3 via the power supply line 6 to supply said sensors with electrical energy. The two torque sensors 11, 12 are designed redundantly with respect to each other. If a fault or even failure of the first torque sensor 11 is detected, the second torque sensor 12 can thus start or take over operation to replace it—or vice versa. The two torque sensors 11, 12 are each connected to the control unit 8 via leads 13, 14 formed as cables or conductor tracks. The two torque sensors 11, 12 transmit the respective torque signals to the control unit 8 via the leads 13, 14. The index sensor unit 5 comprises an index sensor 15, which is designed as a Hall-effect sensor.

Figure 2:
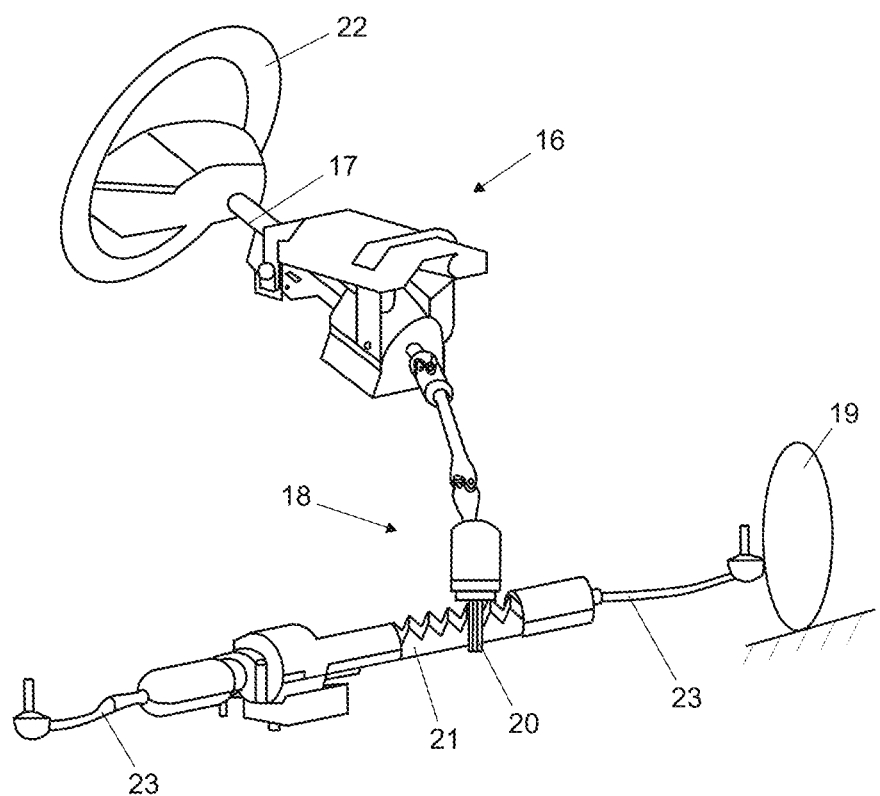
FIG. 2 is a perspective view of an example electromechanical steering system having a sensor assembly.

FIG. 2 shows an electromechanical steering system having the sensor assembly 1 in a perspective, simplified oblique frontal view in the direction the vehicle is traveling, where non-essential components are not shown for the sake of clarity. Apart from the steering system shown in FIG. 2, however, it is also conceivable and possible to provide the sensor assembly according to the invention in a steer-by-wire steering system.

The steering system comprises a steering column 16 with a steering spindle 17. The steering column 16 is mechanically coupled to the steered wheels 19 of the motor vehicle via a steering gearbox 18. The steering gearbox 18 comprises a pinion 20 and a toothed coupling rod 21, wherein the steering gearbox 18 is used to translate a rotational movement of the pinion 20 into a translational movement of the coupling rod 21 along its longitudinal axis. At the end of the steering column 16 facing the driver, a steering wheel 22 is attached for entering a driver's steering request or command, wherein the driver can turn the steering wheel 22 in the usual manner to enter their steering request. The coupling rod 21, which moves linearly along its longitudinal axis, is mechanically coupled on both sides of the motor vehicle with a track rod 23. The track rods 23 are in turn each mechanically coupled to the vehicle wheels 19.

Figure 3:
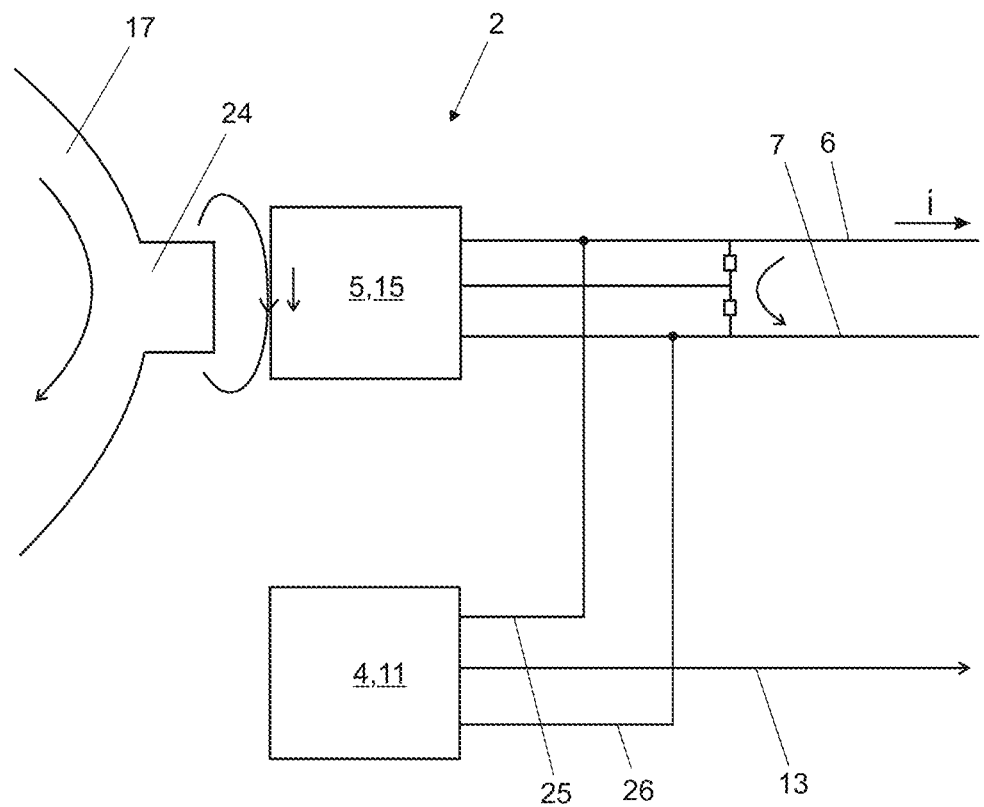
FIG. 3 is a block diagram of an embodiment of a measuring device of a sensor assembly.

FIG. 3 shows an embodiment of the measuring device 2 of the sensor assembly 1 according to the invention which comprises the torque sensor unit 4 and the index sensor unit 5, in a block diagram with a partially indicated steering spindle 17.

The index sensor unit 5 comprises an index sensor 15, which is designed as a Hall-effect sensor. The index sensor unit 5 is arranged in immediate proximity to the steering spindle 17. The steering spindle 17 has a defined point 24 in the circumferential direction, in the form of a metallic elevation. The index sensor unit 5 is designed to detect a condition in which the spatial distance to the defined point 24 is a minimum or falls below a defined threshold value. When the index sensor unit 5 detects such a condition, it generates an index pulse that forms an index signal. The index pulse is a momentary increase in the current consumption of the index sensor unit 5. In other words: The index pulse corresponds to a momentary increase in the current consumption from an initial value, i.e. an activation of the index sensor unit 5 or of the index sensor 15, followed by a decrease in the current consumption back to the original value, i.e. a deactivation of the index sensor unit 5 or of the index sensor 15.

The torque sensor unit 4 comprises a torque sensor 11. The torque sensor unit 4 can transmit the torque signal to the control device 3 via the lead 13. The torque sensor unit 4 and the index sensor unit 5 are connected by leads 25, 26 designed as cables or conductor tracks, which enable power to be transmitted or supplied to the torque sensor unit 4. The increase and decrease of the current consumption of the index sensor unit 5 corresponds to a modulation of the index signal onto the signal that can be transmitted via the power supply line 6 designed as a power lead, which signal is then transmitted to the control device 3. A separate signal lead is not required to transmit the index signal to the control device 3. This is because the index signal can be transmitted to the control device 3 via the power supply line 6 in a form in which it is modulated onto the current signal.

Figure 4:
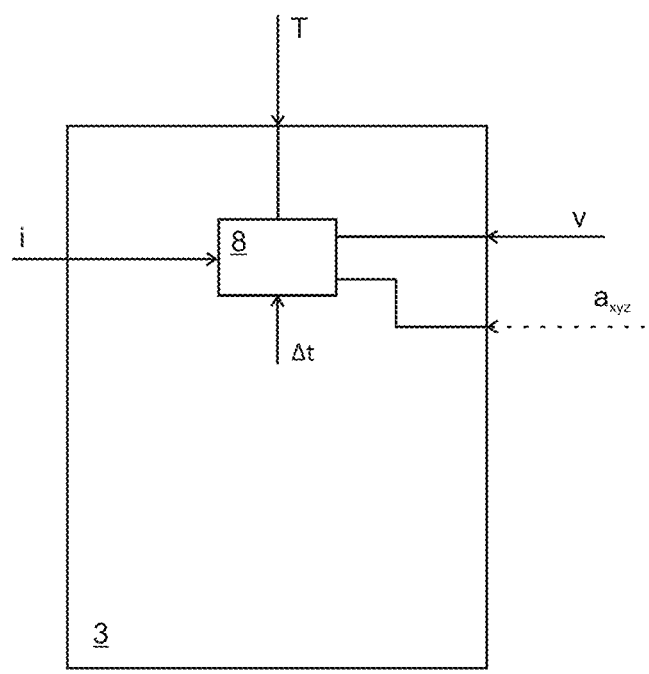
FIG. 4 is a block diagram of an embodiment of a control device of a sensor assembly.

FIG. 4 shows a block diagram of an embodiment of the control device 3 of the sensor assembly 1 according to the invention, which comprises the control unit 8.

The control device 3 is designed to receive a plurality of different signals, on the basis of which the detection of straight-ahead driving is carried out. For example, the control device 3 is designed to receive and process index signals, torque signals, vehicle speed signals, vehicle acceleration signals, and/or time-based signals.

LIST OF REFERENCE SIGNS 1 sensor assembly
2 measurement device
3 control device
4 torque sensor unit
5 index sensor unit
6 power supply line
7 ground lead
8 control unit
9 demodulation unit
10 lead
11 torque sensor
12 torque sensor
13 lead
14 lead
15 index sensor
16 steering column
17 steering spindle
18 steering gearbox
19 vehicle wheel 20 pinion
21 coupling rod
22 steering wheel
23 track rod
24 defined point
25 lead
26 lead

What is claimed is:

1. A sensor assembly for an electromechanical steering system of a motor vehicle, comprising:
   a measuring device; and
   a control device,
   wherein the measuring device comprises a torque sensor unit and an index sensor unit, the torque sensor unit being connected to the control device by a power supply line to supply the torque sensor unit with electrical energy from the control device,
   wherein the sensor assembly is configured to transmit an index signal of the index sensor unit to the control device by modulating a signal transmitted from the index sensor unit to the control device via the power supply line.

2. The sensor assembly of claim 1 wherein the torque sensor unit comprises a modulation unit.

3. The sensor assembly of claim 1 wherein the control device is configured to demodulate the index signal that is modulated.

4. The sensor assembly of claim 1 wherein the control device comprises a demodulation unit.

5. The sensor assembly of claim 1 wherein the signal that is transmitted via the power supply line is a signal of an electrical voltage or a signal of an electrical current strength.

6. The sensor assembly of claim 5 wherein the modulation is a modulation of the electrical voltage or a modulation of the electrical current strength.

7. The sensor assembly of claim 1 wherein the modulation is a frequency modulation or an amplitude modulation.

8. The sensor assembly of claim 1 wherein the torque sensor unit comprises at least two torque sensors, wherein the at least two torque sensors are connected to the control device via the power supply line to supply the at least two torque sensors with electrical energy.

9. The sensor assembly of claim 1 configured to operate on direct current.

10. The sensor assembly of claim 1 wherein the torque sensor unit is not communicatively coupled to the control device by a signal line distinct from the power supply line.

11. The sensor assembly of claim 1 wherein the torque sensor unit is communicatively coupled to the control device only by the power supply line.

12. A method for detecting straight-ahead travel of a motor vehicle comprising a steering spindle by way of the sensor assembly of claim 1, the method comprising:
   supplying electrical energy from the control device to the torque sensor unit via the power supply line;
   providing a torque signal by way of the torque sensor unit;
   providing an index signal by way of the index sensor unit;
   transmitting the torque signal to the control device;
   transmitting the index signal from the index sensor unit via the power supply line to the control device by modulation; and
   detecting straight-ahead travel based on the torque signal and the index signal.

13. The method of claim 12 wherein transmitting the index signal comprises:
   modulating the index signal provided onto the signal that is transmittable via the power supply line;
   transmitting the modulated signal that is transmittable via the power supply line to the control device; and
   demodulating the index signal.

* * * * *